United States Patent [19]

Gambale et al.

[11] 4,020,396
[45] Apr. 26, 1977

[54] TIME DIVISION MULTIPLEX SYSTEM FOR A SEGREGATED PHASE COMPARISON RELAY SYSTEM

[75] Inventors: John C. Gambale, Livingston; Roger E. Ray, Parsippany, both of N.J.

[73] Assignee: Westinghouse Electric Corporation, Pittsburgh, Pa.

[22] Filed: Mar. 10, 1976

[21] Appl. No.: 665,650

Related U.S. Application Data

[63] Continuation of Ser. No. 548,132, Feb. 7, 1975, abandoned.

[52] U.S. Cl. .................................. 361/64; 361/45
[51] Int. Cl.² ....................................... H02H 7/26
[58] Field of Search ............ 317/27 R, 27 A, 29 A, 317/29 B; 340/409, 253 A, 256, 163; 343/204

[56] References Cited

UNITED STATES PATENTS

| | | | |
|---|---|---|---|
| 2,677,014 | 4/1954 | Moynihan | 317/29 A |
| 3,882,361 | 5/1975 | Hinman, Jr. | 317/29 A |
| 3,893,008 | 7/1975 | Strickland et al. | 317/29 A |

*Primary Examiner*—Harry Moose
*Attorney, Agent, or Firm*—S. A. Seinberg

[57] ABSTRACT

This disclosure relates to a protective relaying system for a polyphase power transmission line in which at least two separate line operating conditions at a remote end of a protected line section are transmitted to a local end of the line section over a single communication channel. In the preferred illustrated embodiment, the operating conditions of three-line conductors are sequentially transmitted whenever a fault condition is sensed on any one or more of the three-line conductors. During the normal, non-faulted operation, a coded signal is continually transmitted to maintain the time derived signals at the receiver in substantial synchronism with the time derived signals of the transmitter. The coded signal also establishes a trip inhibiting or guard signal at the receiver.

32 Claims, 4 Drawing Figures

TIME DIVISION MULTIPLEX SYSTEM FOR A SEGREGATED PHASE COMPARISON RELAY SYSTEM

This is a continuation of application Ser. No. 548,132 filed Feb. 7, 1975, and now abandoned.

BACKGROUND OF THE INVENTION

A segregated phase comparison relaying system which is arranged to phase compare the current in each of the phase conductors as well as the ground fault current is described and claimed in an application for U.S. Pat. Ser. No 402,687, now allowed, and which has been assigned U.S. Pat. No. 3,893,008 and an issue date of Jul. 1, 1975. As set forth therein, a separate communication channel is provided for each of the transmitted line operating conditions. In accordance with the teachings of this invention, a single channel is used to transmit a time divided multiplexed signal which sequentially contains all of the line operating conditions. The multiplexed signal is decoded at the receiver with a minimum time delay upon the occurrence of a fault. In the illustrated embodiment, a guard word of 6 data bits is continually transmitted in the absence of a fault, from the transmitter location (hereinafter sometimes referred to as the remote location). This guard word contains a synchronizing signal that maintains the 6 data bit counter at the receiver location (hereinafter sometimes referred to as the local location) in exact synchronism with the 6 data bit signal generator at the remote location. As long as the data bits of the guard word are being received, a guard or inhibit signal will be maintained at the local location. The data-bit arrangement of the guard word determines the time of the occurrence of the synchronizing signal at the local location.

When a fault condition is sensed at the remote location, the transmission of the guard word is terminated and the transmission of the proper fault word, which describes the existing fault operating condition, is initiated. The fault words contains three data-bits, each data-bit representing the line conducting condition of a different line conductor as determined by its sensor. The three data-bits for the three separate line conductor sensors are always generated in a predetermined order and exist for the same predetermined time interval. Since the time intervals of the demodulating or decoding network at the receiver are synchronized with the time intervals of the coding network at the transmitter, and the data-bits of the fault words are derived by scanning the outputs of the line sensors in an endless chain or loop, the data-bits from the remote location may be time decoded for determining at the local location the operating condition of the individual line conductors at the remote location.

It should be appreciated from the foregoing that under normal operating conditions, a code word from the transmitter maintains the decoder of the receiver synchronized so that when a fault occurs, the comparison of the operating conditions of the line conductors at the local and remote locations is initiated without delay whereby the proper circuit breakers may be acutated promptly to deenergize the faulted conductor or conductors, as the case may be.

DESCRIPTION OF THE PREFERRED EMBODIMENT

Figure 1:
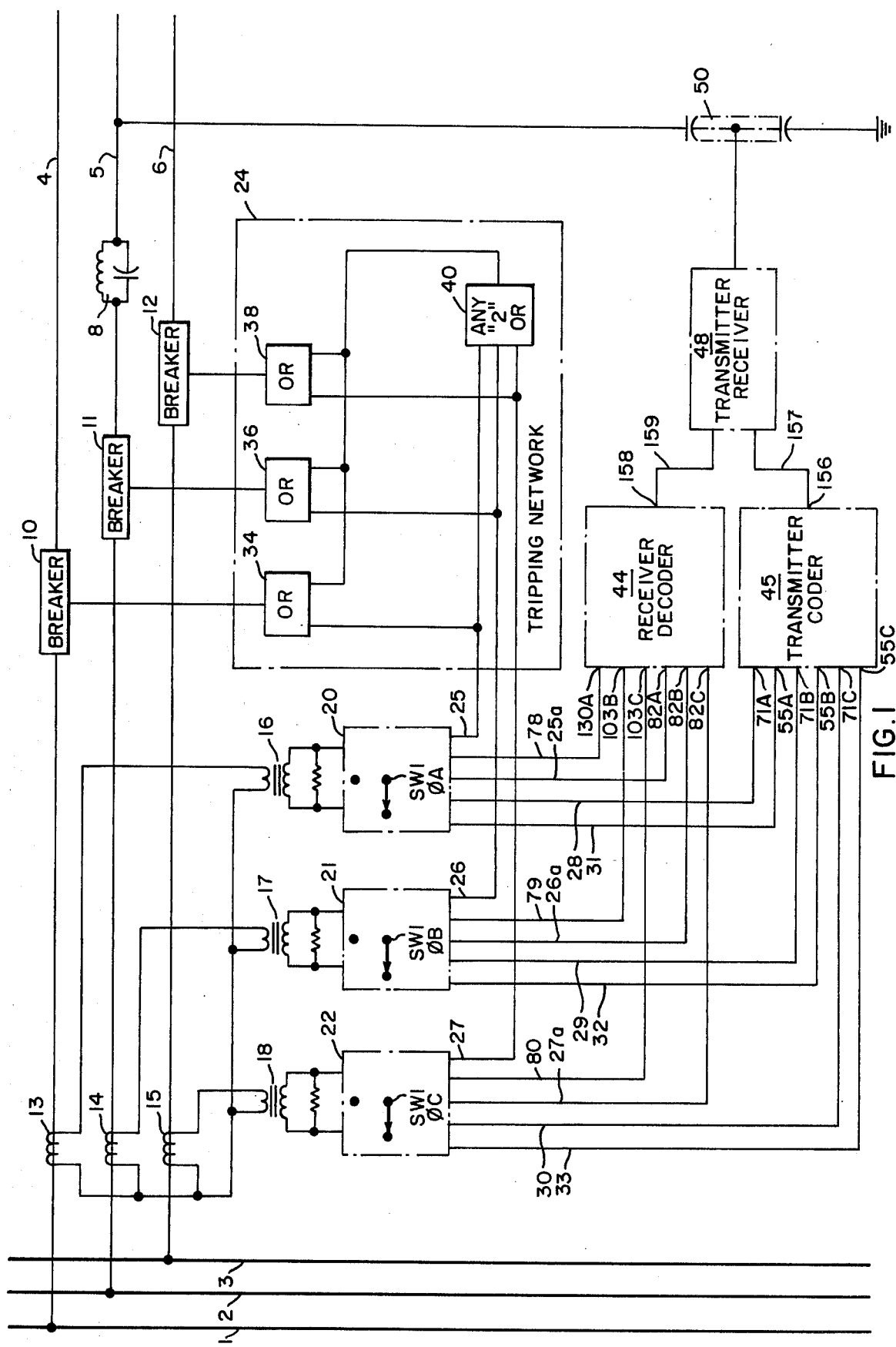
FIG. 1 is a block diagram of a relaying network embodying apparatus for transmitting and receiving line operating information in accordance with the inventon.

Referring to the drawings by characters of reference, the numerals 1, 2 and 3 indicate the hase busses or conductors of a three-phase power supply which are suitably energized from one or more power sources (not shown). Phase conductors 4, 5 and 6 of a three-phase power transmission line are energized respectively from the phase busses 1, 2 and 3 through breakers 10, 11 and 12. The low pass filter 8 offers substantially no impedance to the transmission of power at the Hz of the transmitted power, but provides a high impedance to the carrier Hz which transmits intelligence to the remote relaying apparatus at the remote station (not shown) over the transmission line phase conductor.

For simplicity, only the relaying apparatus associated with one end of the protected line section is illustrated. It is to be distinctly understood, however, that a similar relaying apparatus is associated with the other end of the protected line section. It is also to be understood that the receiver at one end tuned to receive information transmitted by the transmitter at the other end of the protected line section and vice versa.

Current transformers 13, 14 and 15 are associated with the phase consuctors 4, 5 and 6 and provide output quantities which are related to the phase of, and the magnitude of, the current in the phase conductors 4, 5 and 6. The output quantities of the current transformers 13, 14 and 15 are supplied to the primary windings of current isolating transformers 16, 17 and 18. Each of the current transformers 16, 17 and 18 have their secondaries individually connected to individual loading resistors so that the output quantities supplied to the phase current responsive relaying networks 20, 21 and 22 are voltage signals.

The networks 20-22 are provided with individual output conductors 25-27 and 28-30, respectively, which normally are deenergized to provide logical 0 output signals, but which will be energized to provide logical 1 output signals in response to the operation of its associated fault detector described more fully below in connection with the description of FIG. 2

A breaker tripping network 24 includes a plurality of OR networks 34, 36 and 38, and an ANY-2-OR network 40. Each of the OR networks 34, 36 and 38 has two input terminals. A first input terminal of these OR networks is connected respectively to the output conductors 25, 26 and 27 of the networks 20, 21 and 22 associated with phases A, B and C. Each of these OR networks 34, 36 and 38 has a second input terminal connected to the output terminal of the ANY-2-OR network 40. The ANY-2-OR network 40 has its three input terminals connected individually to the conductors 25, 26 and 27.

The networks 20-22 are each coupled to the receiver decoder 44 and to the transmitter coder 45. The receiver decoder 44 and the transmitter coder 45 are illustrated in greater detail in FIGS. 3 and 4. The receiver decoder 44 is connected to the output of the receiver portion of the transmitter-receiver 48 and the transmitter-coder is connected to the transmitter portion of the transmitter-receiver 48.

Figure 4:
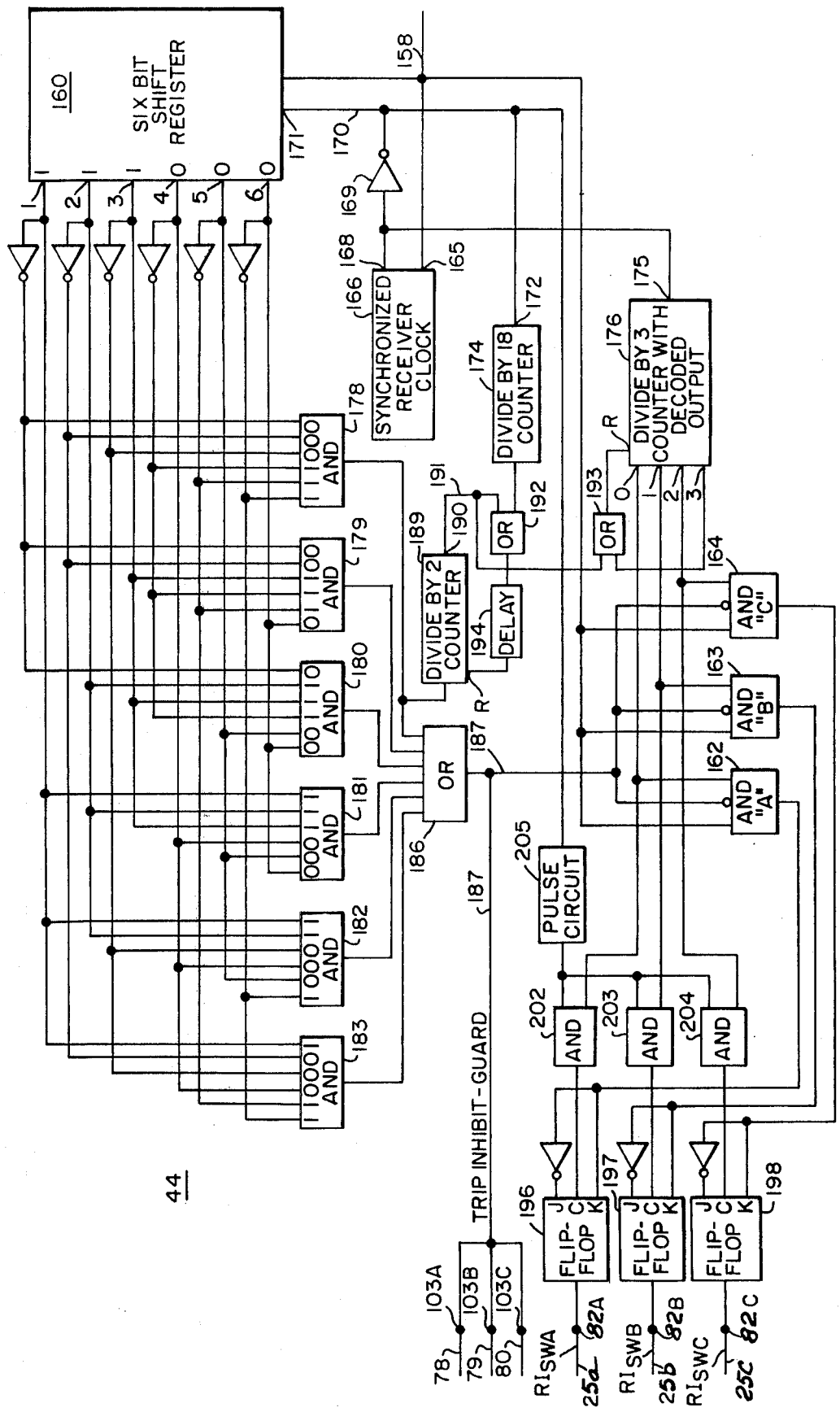
FIG. 4 is a functional block diagram of the receiver decoder.

As indicated more fully in FIG. 4, the illustrated receiver decoder 44 receives three sequentially arranged input signals in endless fashion during fault operation. These input signals or data-bits are sequentially supplied to the networks 20-22 through the conductors 25a-27a, respectively. It will be apreciated, however, that within the scope of the invention, the transmitter coder 45 as well as the receiver decoder 44, connected to the networks 20-22 by the conductors 28-30 respectively, may be arranged for any number of sequentially arranged output and input signals. The transmitter-receiver 48 transmits and receives signals over one of the phase conductors, illustrated in FIG. 1 as being the conductor 5. The output-input of the transmitter receiver 48 is connected to an intermediate tap of a coupling capacitor 50 which is connected between the line conductor 5 and a ground or earthed conductor.

While the transmission of intelligence between the remote and local stations is illustrated in this aplication as being by power line carrier it will be understood that other means may be used to transmit the intelligence, such as microwave or leased telephone circuit, among others.

Figure 2:
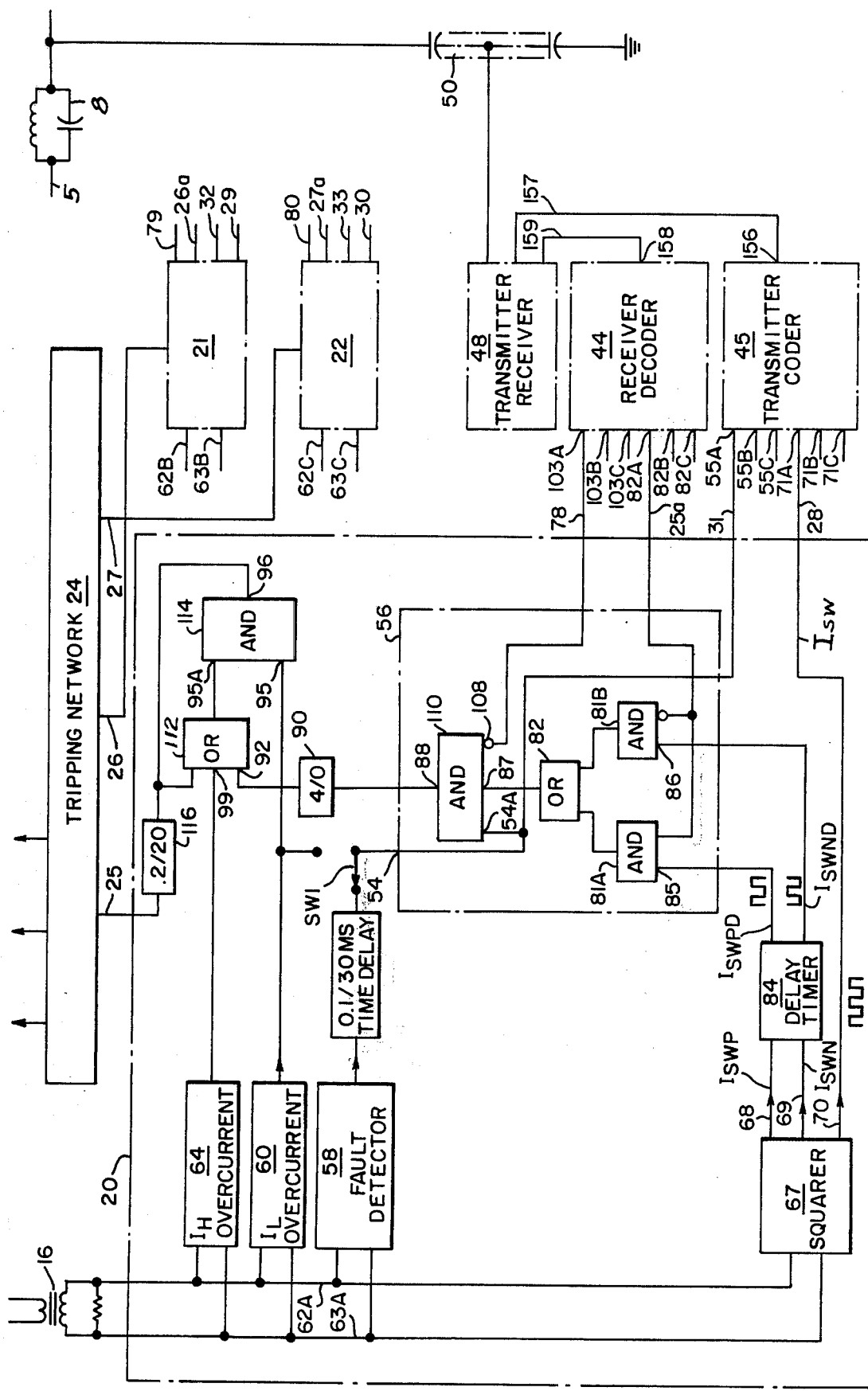
FIG. 2 is a block diagram showing in greater detail certain of the features of the relaying apparatus for relaying the phase and residual currents more generally disclosed in FIG. 1.

For purposes of simplifying the disclosure, only a sungle relaying network 20 is illustrated in FIG. 2. The networks 21 and 22 are identical to the network 20. As illustrated in FIG. 1, the networks 20-22 have their switches SW1 positioned such that the fault detector 58 (see FIG. 2) controls the response of the network to a fault. This is the position when these networks are energized with phase current quantities. With the switch SW1 in its other position, the network could be used as a ground fault responding relay. In this instance, the $I_L$ overcurrent network 60 would provide the fault signal thereby making this network sensitive to a lower current than it would be if the fault detector 58 were used. This is possible because any ground current flow above a predetermined magnitude, as represented by the setting of the $I_L$ overcurrent network 60, is indicative of a ground fault.

The relaying network 20 is provided with a current derived signal through the isolating current transformer 16 and energizes the loading resistor whereby the output busses 62A and 63A supply a voltage quantity proportional to current to the $I_L$ overcurrent network 60, and $I_H$ overcurrent network 64, the fault detector or current change network 58 and a squarer network 67.

The local squarer network 67 is provided with three output conductors 68, 69 and 70, which transmit square wave signals $I_{SWP}$, $I_{SWN}$ and $I_{SW}$ which are of the same Hz as that supplied to the busses 62A and 63A and are phase related thereto. The signal $I_{SW}$, as will be set forth below, has a positive square wave portion, which is of the same phase as the voltage supplied to the local squarer 67, and which is in phase with and of substantially identical length to the positive half cycle of the input voltage waves. The quantity $I_{SW}$ is supplied to the input terminal 71A of the transmitter coder 45 through the conductor 28.

Under normal non-fault conditions, a logical 1 signal will be supplied by the receiver decoder 44 through the conductor 78 to the NOT input terminal 108 of the AND network 110. This guard or trip inhibit logical 1 signal prevents the AND network 110 from acutating the timer 90 and consequently the breaker 10 as long as the guard signal exists. Also during normal non-fault conditions, the fault detector 58 supplies a logical 0 input signal to the input terminal 54A of the AND network 110. Further, to prevent false tripping of the breaker 10 due to line charging current, the $I_L$ overcurrent network 60 is arranged to provide a logical 0 signal to the AND network 114 at current magnitudes below those caused by charging current. The output terminal 96 of the AND network 114 is connected through a timer 116 to the imput terminal 25 of the tripping network 24. Both of its input terminals 95 and 95A must receive logical 1 signals to cause the breaker 10 to trip.

In the event of an extremely high fault current, the $I_H$ overcurrent network 64 provides a logical 1 input signal to the input terminal 99 of an OR network 112. The output of the OR network 112 is connected to a second input terminal 95A of the AND network 114. Since the $I_L$ network 60 provides its logical 1 output at a current level below that of the $I_H$ network 64, the extremely high fault current, logic 1 signals will be applied to both of the input terminals 95, 95A to time out the timer 116 and provide a logical 1 tripping signal to the tripping network 24 for tripping the breaker 10 without the necessity of phase comparing the current at the two ends of the protected end section.

The relaying networks 21 and 22 are provided with input busses 62B-63B and 62C-63C for energization by the transformers 17 and 18 resectively. Similarly, the networks 21 and 22 are provided with output conductors 29 and 30 for connection with the input terminals 71B and 71C respectively of the transmitter coder 45.

The output quantities $I_{SWP}$ and $I_{SWN}$ from the busses 68 and 69 are supplied through a delay timer 84 to the input terminals 85 and 86 respectively, of AND networks 81A and 81B. The normal input terminal of the AND network 81A and the NOT input terminal of the AND network 81B are connected to the input terminal 82A of the receiver decoder 44 by the conductor 25a. The output terminals of the AND networks 81A and 81B are connected to the two input terminals of an OR network 82, the output terminal of which is connected to an input terminal 87 of the AND network 110.

It will be appreciated that when logic 1 signals are applied to both terminals of the AND network 81A, the OR network 82 will apply a logic 1 signal to the AND network 110 and likewise during the time that a logic 0 signal is applied to the conductors 25a by the output terminal 82A of the receiver decoder 44 and a logic 1 signal is applied to the input terminal 86 of the AND network 81B, the OR network 82 will again supply a logic 1 signal to the terminal 87 of the AND network 110.

As indicated above, this supplied logical 1 signal is ineffectual as long as iogic 0 signals are not supplied to the input terminal 108 from the receiver decoder output terminal 103A through conductor 78 and/or a logical 1 signal is not supplied to the input terminal 54A of the AND network 110 by the fault detector 58.

The output of the fault detector 58 is also supplied from the network 20 through the conductor 31 to an input terminal 55A of the transmitter coder 45. The input terminals 55B and 55C of the transmitter coder 45 are connected by the conductors 32 and 33 of the network 21 and 22. Similarly, the conductors 28, 29 and 30 connect to the input terminals 71A, 71B and 73C, respectively of the transmitter coder 45 to the networks 20, 21 and 22 whereby these input terminals are energized by the $I_{SW}$ quantities thereof.

Figure 3:
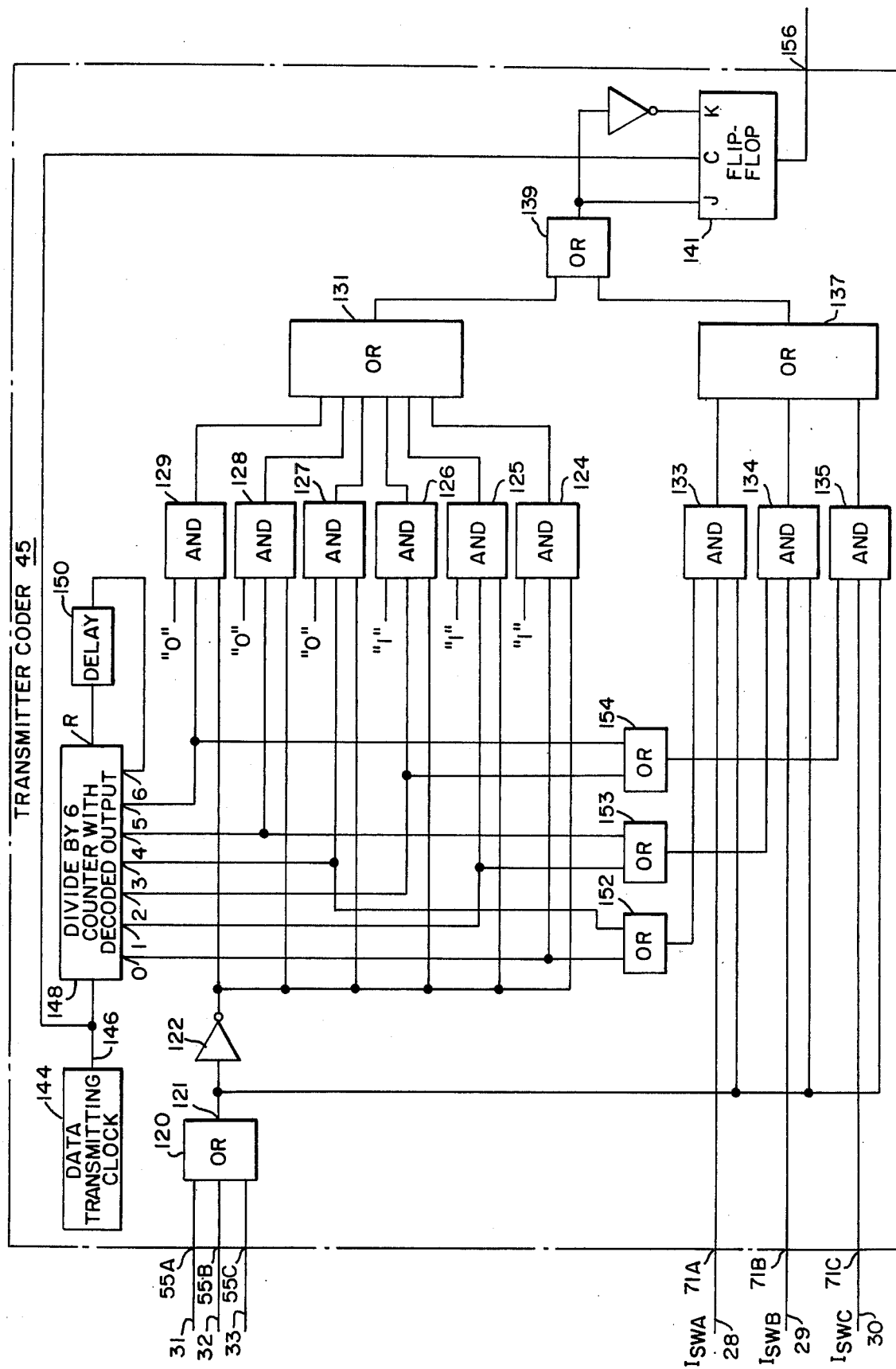
FIG. 3 is a functional block diagram of the transmitter coder.

Referring now more particularly to FIG. 3, transmitter coder 45 comprises an OR network 120 having three input terminals connected to the input output conductors 31, 32 and 33 of the networks 20-22. The output terminal 121 of the OR network 120 is connected through an inverter 122 to the lower input terminals of each of a plurality of AND networks 124, 125, 126, 127, 128 and 129. The output terminals of these AND networks are connected to input terminals of an OR network 131. The output terminal 121 of the OR network 120 is also connected directly to the lower input terminals of each of a plurality of AND networks 133, 134 and 135. The output terminals of these last-named AND networks are connected to the input terminals of an OR network 137. The output terminals of the OR networks 131 and 137 are connected to the input terminals of an OR network 139, the output terminal of which is connected to the J and K input terminals of a JK flipflop 141 having a clocking input terminal C. The connection to the K terminal includes an inverter.

It will be appreciated that as long as all of the conductors 31, 32 and 33 apply logical 0 signals to the OR network 120, the AND networks 124 through 129 are armed and the AND networks 133 through 135 are disarmed. When, however, a fault occurs and one or more of the conductors 31, 32 and 33 apply a logic 1 signal to the OR network 120, a logic 1 arming signal will be supplied to the lower input terminals of the AND networks 133 through 135 and the arming signal to the AND networks 124-129 will be removed so that these AND networks 124-129 are no longer effective to actuate the OR network 131. The transmitter coder 45 includes a data transmitting clock 144 which provides an endless series of timed pulses at its output conductor 146. These pulses are supplied to the divide-by-6 counter with decoded output 148 and to the clocking terminal C of the flip-flop 141. The output terminals 0, 1, 2, 3, 4, 5 and 6 of the divide-by-6 counter 148 are sequentially energized with a logical 1 output signal as a consequence of the series of output pulses from the data transmitting clock 144. The logical 1 output signal from the output terminal 6 is supplied through a delay network 150 to the reset terminal R of the counter 148. The delay time interval provided by the delay network 150 is preferably less than ¼ of the time interval between the individual output pulses of the data transmitting clock and resets the counter 148 at the end of each 6 counts.

The output terminals 0 through 5 are individually connected to the middle input terminals of the AND networks 124-129 respectively. The output terminals 0 and 3 are connected to an OR network 152, the output terminals 1 and 4 are connected to the input terminals of an OR network 153 and the output terminals 2 and 5 are connected to the input terminals of an OR network 154. The output terminals of these OR networks 152, 153 and 154 are connected individually to the upper input terminals of the AND networks 133-135.

The upper input terminals of the AND networks 124-129 are supplied with coding signals as desired. At least one of these coding signals must be of a different logical sign than the others. As indicated, the upper input terminals of the AND networks 124-126 are supplied with logical 1 signal, while those of the AND networks 127-129 are supplies with logical 0 signals.

With this coding, the transmitting word, with the networks 20-22 operating in a non-fault condition, will be 111000. The data-bits of the coded signal or word will be repeated continually as long as the non-fault condition continues (no logical 1 input signals are applied to the OR network 120). The logical signals from the OR network 131 are supplied through the OR network 139 to the JK input terminals of the flip-flop 141. When logical 1 signals are supplied by the output terminals 0, 1 and 2 of the counter 148 to the AND networks 124, 125 and 126, one of these AND networks and the data clock provides the conducting pulse to the clocking terminal C, the flip-flop will provide a logical 1 output at the coder output terminal 156.

The logical signal from the terminal 156 is supplied to the transmitter-receiver 48 by the conductor 157 and the transmitter-receiver 48 will transmit accordingly. Similarly, when logical 1 signals are supplied by the outputs 3, 4 and 5 of the counter 148, the AND network 127-129 will supply logical 0 signals to the flip-flop 141 and logical 0 signals will be transmitted by the conductor 157 to modulate the transmitter whereby the transmitted signal is in accordance therewith. The transmitted code word will represent 111000 with the data bits being transmitted in sequence.

Upon the occurrence of a fault, sensed by any one or more of the fault detectors of the networks 20, 21 and 22, the OR network 120 will provide a logical 1 output signal. This removes the arming signal from the AND networks 124-129 and applies an arming signal to the AND networks 133-135. The AND networks 133, 134 and 135 receive their second arming signals from the divide-by-6 counter 148 through the OR networks 152-154. Therefore, when a logical 1 output signal appears at either of the output terminals 0 or 3, a logical 1 output signal will arm the AND network 133. When a logical 1 signal appears at either of the output terminals 1 or 4, the AND network 134 will be armed. When a logical 1 signal appears at either of the output terminals 2 or 5, the AND network 135 will be armed. Since the remaining input terminals of the AND networks 133, 134 and 135 are individually connected to the conductors 28, 29 and 30, respectively, output logical signals of the AND networks 133, 134 and 135 will then be in accordance with the logic state of the output conductors 28-30 of the networks 20-22 as determined by the phase currents in the phase conductors 4, 5 and 6 respectively. By reference to FIG. 2, it will be appreciated that the logic signal supplied by the conductors 28-30 will be logic 1 signals during ½ cycle of the input signal $I_{SW}$ supplied to the squarer 67 and logical 0 during the other half cycle of the input signal supplied to the squarer 67 of the networks 20, 21 and 22 respectively. Therefore, the OR network 137 will modulate the transmitted signal to sequentially transmit data bits which represent sequentially the $I_{SW}$ signals of the networks 20, 21 and 22.

Summarizing, the output terminal 156 will be energized in accordance with the code established by the AND networks 124-129 during non-fault operation. During the fault operation, the output terminal 156 will be energized in accordance with the phase of the current flowing on the lines 4, 5 and 6 as scanned by the divid-by-6 counter 148.

The transmitter-receiver 48 may take any desired form that will transmit data bits in sequence which are in accordance with the series of logical 0 and logical 1 signals supplied to its inputs. The output signal of the transmitter-receiver 48 is supplied through the usual coupling capacitor 50 to the conductor 5 and transmitted to the transmitter-receiver 48 at the other end of the protected line section. The receiver at the other end of the line section receives the transmission and energizes its output terminal in accordance with the data bit information in the received signal.

The receiver decoder 44 shown in greater detail in FIG. 4, has its input terminal 158 connected to the output terminal of the transmitter-receiver 48 by a conductor 159. The data bit signals energize a 6 data bit shift register 160, the non-inverted input terminals of AND networks 162, 163 and 164 and the synchronized receiver clock 166. The receiver clock 166, like the data transmitting clock 144, may be crystal controlled and tuned to provide its output timing pulses in substantial synchronization with the clock 144. The data bit pulses of the incoming signal maintain the output signals of the synchronized receiver clock 166 in predetermined phase relationship and with the received data bits. Preferably, this phase relationship is such that the synchronized output clocking pulses at the output terminal 168 of the clock 166 are in substantial phase relationship with the received data bits.

The output terminal 168 of the clock 166 is connected through an inverter 169 to a timing bus 170. This bus 170 is connected to the clocking terminal 171 of the shift register 160 and the input terminal 172 of a divide by 18 counter 174. The input terminal 175 of a divide-by-3 counter with decoded output 176 is connected directly to the output 168.

The shift register 160 is provided with a plurality of output terminals 1-6. As the data input bits are received at the input terminal 158, the output bits or quantities progressively shift from the terminal 6 to 1, respectively, in the usual manner. As illustrated in FIG. 4, the inverted signal from the output terminal 6 is connected to one input terminal of the AND networks 178, 182 and 183 and the non-inverted signal therefrom to one input terminal of the AND networks 179, 180 and 181. The inverted output of the terminal 5 is connected to one input terminal of the AND networks 178, 179 and 183 and the non-inverted signal therefrom to one input terminal of the AND networks 180, 181 and 182. Similarly, the output terminals 4, 3, 2 and 1 are connected through normal and inverting circuits to the other input terminals of the AND networks 178, 179, 180, 181, 182, 183 as illustrated.

When a full input sequence of the code word, 111000 has been supplied to the input terminal 158, the AND network 178 will provide a logical 1 output signal to one input terminal of an OR network 186. The next data-bit input signal of the code word will provide an output signal 110001 sequentially along the terminals 6-1 and the AND network 183 then provides a logical 1 input signal to the OR network 186. Similarly, as the sequence of input data bits of the code word progresses, the AND networks 182, 181, 180 and 179 will in sequence provide logical 1 signals to the OR network 186. Therefore, it will now be appreciated that as long as the code word is being transmitted to the receiver 44, one of the AND networks 178-183 will supply a logical 1 signal to the OR network 186 and network 186 will energize its output bus 187 with a logical 1 output signal.

This bus 187 is connected to the trip inhibit or guard signal output terminals 103A, 103B and 103C whereby guard or trip inhibit signals will be supplied to the AND networks 110 of the relaying networks 20, 21 and 22 through the conductors 78, 79 and 80. The bus 187 is also connected to the NOT input terminals of the AND networks 162, 163 and 164. Therefore, as long as a logical 1 signal is supplied to the bus 187, these AND networks are prevented from providing any logical 1 output signals at their output terminals.

Each time the synchronizing word 111000 is completed, a logical 1 signal is supplied by the AND network 178 to the divide-by-2 counter 189. Each second time the complete signal 111000 is received, output terminal 190 of the divide-by-2 counter supplies an output pulse through the output bus 191 to the one input terminal of an OR network 192 and one input terminal of an OR network 193. The output terminal of the OR network 192 is connected through a delay network 194 to the reset terminal R of the counter 189. The other input terminal of the OR network 192 is connected to the output terminal of the divide-by-18 counter 174. This counter 174 provides a logical 1 output signal every eighteen data bit pulses supplied thereto by the synchronized receiver clock 166. The output terminal of the OR network 193 is connected to the reset terminal R of the divide-by-3 counter line.

The counter 176 is driven by the output pulses of the clock 166, in step with the input signal received at the terminal 158, and is reset every three clock pulses. For this purpose, its four count output terminal 3 is connected to the reset input terminal R through the OR network 193. This resetting arrangement of the counter 176 by the counter 189 and by the clock 166 maintains the counter 176 in proper step for comparing the date-bits of the fault words (current conditions of phases A, B and C) with the current sensors (current conditions of phases A, B and C) at the receiver end irrespective of noise or other transient conditions which might otherwise cause an out of step condition.

The output terminals 0, 1 and 2 of the counter 176 are connected to third input terminals of the AND networks 162, 163 and 164 respectively. The counter 176, which is synchronized with the data-bits of the received fault word supplied by transmitter coder network 45, scans the fault word so that the data-bits of the fault words supplied by the networks 20-22 associated with the phase conductors 4, 5 and 6 at the transmitter end of the protected line section are arranged to supply signals to the J-K flip-flops 196, 197 and 198 which are associated with the relaying networks associated with the phase conductors 4, 5 and 6 at the receiving end of the protected line section.

More specifically, the AND networks 162, 163 and 164 are armed in sequence with the A, B and C phase data-bits of the fault words so that logical 1 and 0 output signals appear at their output terminals in direct accordance with the current condition of the A, B and C phases at the transmitting location. The output terminals of the AND networks 162, 163 and 164 are connected respectively to the K input terminals of the flipflops 196, 197 and 198 directly and to the J input terminals through inverters.

The output terminals 0, 1 and 2 of the counter 176 are connected to one of the input terminals of each of AND networks 202, 203 and 204 respectively and supply arming signals thereto in synchronism with the received data-bits of the fault works. The other input terminals of these AND networks 202, 203 and 204 are connected to the timing bus 170 through a pulse circuit 205. The output circuits of the AND networks 202, 203 and 204 are connected individually to the clocking input terminals C of the flip-flops 196, 197 and 198. The output terminals 82, 82 and 82 of the flip-flops 196, 197 and 198 will be energized with logical 1 and logical 0 signals in delayed time synchronism with the data-bits of the fault words in direct accordance with the $I_{SW}$ quantities of the relaying networks at the transmitting end of the protected line sections. At the receiving end these outputs become $RI_{SWA}$, $RI_{SWB}$, and $RI_{SWC}$ respectively.

It will be understood from the foregoing that as long as the operating condition of the power line is fault free, the coded signal will be transmitted and maintain the receiver clock 166 in exact synchronism with the data transmitting clock 144, maintain counter 176 in step with the operation of the AND networks 133, 134 and 135, and supply a trip inhibit or guard signal to the relaying networks 20-22 associated with the receiver. When a fault occurs, the transmission of the code word is immediately interrupted and the transmitter immediately initiates the transmission of the data-bits of a fault word. The character of each of these data-bits of the fault word is determined by scanning the $I_{SW}$ signals of the remote relaying networks 20-22 and comparing the $RI_{SWA}$, $RI_{SWB}$ and $RI_{SWC}$ data bits with the $I_{SWA}$, $I_{SWB}$ and $I_{SWC}$ quantities of the local networks 20-22. When the transmission of the code word terminates, the receiver decoder removes the trip inhibit or guard signal from its output terminals 103A, 103B and 103C so that the input terminals 108 of the AND networks 110 of the relaying networks associated with the receiver are now energized with a logical 0 signal and these input terminals are armed.

The logical 0 output signal of the OR network 186 also arms the NOT input terminals of the AND networks 162, 163 and 164 and these networks become effective to supply output signals to the JK input terminals of the flip-flops 196, 197 and 198 in accordance with the data bits of the fault word being received. The pulse circuit 205 provides delayed clocking pulses to the clocking terminals C of these flip-flops as determined by the AND networks 202, 203 and 204. This delay of clocking pulses insures that the proper logic signal will be at the JK terminals before the flipflop is actuated so that the correct $RI_{SWA}$, $RI_{SWB}$ and $RI_{SWC}$ signals are provided.

The AND networks 81A and 81B of the networks 20-22 at the local receiver are energized with current signals derived from the local end and with current signals derived from the remote end of the phase current conductors 4, 5 and 6. If these current signals associated with the faulted conductor or conductors are phased such that the current is flowing into the line at both the local and the remote end at the same instant or outwardly of the protected line section at the same instant, the AND networks 81A and 81B will supply logical 1 signals through the OR network 82 to the input terminal 87 of the corresponding AND netwrok 110 and the fault is internal. If no logical 1 signals are supplied, the fault is external to the protected line section. The fault detector or detectors 58 which are associated with the faulted conductor or conductors will supply logical 1 signals to the associated AND network or networks 110 so that when the OR network 82 supplies its logical 1 signal, a logical 1 signal will be supplied from the output terminal 88 to the timer 90 which thereupon starts to time out. As soon as the timer 90 times out, a logical 1 input signal appears at the input terminal 92 of the OR network 112 to provide a logical 1 signal at the input terminal 95A of the AND network 114. Since the $I_L$ network 60 is at this same time supplying a logical 1 input signal to the input terminal 95, the AND network 114 energizes the timer 116, which after the 0.2 m.s. delay, provides a logical 1 input signal to the tripping network 24 through the input conductor 25. If a single conductor is faulted, only the breaker associated with the faulted conductor will be tripped. However, if two conductors are faulted, the ANY-2-OR- network will be actuated and all three breakers will be tripped.

In the event that logical 1 signals are not concurrently supplied to the AND network 81A or logical 1 and logical 0 signals to the AND network 81B, the fault is external to the protected line section and no logical 1 signal will be supplied by the OR network 82 to the input terminal 87 of the AND networks 110. Under external fault conditions the tripping network 24 will not be actuated.

What is claimed and is desired to be protected by United States Lettters Patent is as follows:

1. A protective relaying apparatus of the type in which at least two separate line operating conditions which exist at one end of a protected power line section are communicated to the other end of the protected power line section over a single communication channel, said apparatus comprising, a transmitter located at a said one end, a first means associated with said line section at said one end and including a pair of line operating condition sensors arranged to sense a first pair of line operating conditions at said one end, said first means being effective to provide a normal output signal when the line operating condition is normal, each of said sensors being effective to provide a fault output signal when the line operating condition with which it is associated is faulted, a first clock actuated divice providing a first series of repeating periodic clocking signals, a transmitter modulating means interconnecting said clocking device and said transmitter and said sensing means, said modulating means being effective when receiving said normal signals from said first means to time-code said signals into a repeating time-coded normal word, said normal word comprising a plurality of serially arranged data bits, said modulating means being effective when a said fault signal is being received to terminate the time-coding of said normal word and to time-code fault words, each said fault word comprising a plurality of serially arranged data bits, the character of said data bits of said fault word being determined by scanning said output signals of said sensing means in a predetermined sequence, a receiver located at said other end and adapted to receive said words from said transmitter as a series of data bits, a second clocking device associated with said receiver and providing a second series of periodic clocking signals which have substantially the same time periods as the time periods of said first series, a first demodulating network connected to said receiver and to said second clocking device, said demodulating network having first and second output circuits, said demodulating network having a storage device having a predetermined number of output circuits, said storage device being effective when said receiver is sequentially receiving said data bits of said normal word to store said predetermined number of said received data bits in parallel form at its said output circuits, said predetermined number being at least the number of bits in said normal word, said demodulating network being effective each time said normal word is stored in said storage device to provide a synchronizing signal at its said first output circuit, a resetting counting means connected to said second clocking device and having a plurality of sequentially actuated output circuits, said counting means having a resetting input which when actuated resets said counting means to an initial condition in which a predetermined one of its said output circuits is actuated, means interconnecting said first output circuit of said demodulating network to the said resetting input of said counting means whereby said synchronizing pulses are effective to actuate said resetting input of said counting means whereby said counting means is reset by said demodulating network to maintain a desired relationship between the actuation of said output circuits of said counting means and said data bits as received by said receiver by said receiver being effective upon the reception of a said fault word by said receiver to sequentially scan the data bits of said received fault word in a sequence determined by the sequential actuation of said output circuits of said resetting counting means.

2. The relaying apparatus of claim 1 in which said first demodulating network includes a plurality of data-bit analyzing networks, each of said analyzing networks having a plurality of input circuits and an output circuit, said input circuits of each of said analyzing networks being connected individually with said output circuits of said storage device, each of said just-named individual connections having an individual sequence whereby said output circuit of a different one of said analyzing networks will be actuated for each order of said data bits of said normal word, and a normal word actuated circuit connected to said output circuits of said analyzing networks and effective to provide a control signal as long as any one of said analyzing networks is actuated.

3. The relaying apparatus of claim 1 in which said receiver includes a second demodulating network, said second demodulating network including a plurality of gating networks, each of said gating networks having a principal circuit having two terminals, each of said gating networks having a first gate controlling circuit controlling the conducting condition of its said principal circuit, circuit means individually connecting said controlling circuits of said gating networks to said output circuits of said resetting counting means, and circuit means connecting one of said two terminals of said principal circuit of each of said gating network to said receiver for energization by said received data bits, and separately actuated devices individually connected to the other of said two terminals of said principal circuits.

4. The relaying apparatus of claim 3 in which said first demodulating network includes a plurality of data-bit analyzing networks, each of said analyzing networks having a plurality of input circuits and an output circuit, said input circuits of each of said analyzing networks being connected individually with said output circuits of said storage device, each of said just-named individual connections having an individual sequence whereby said output circuit of a different one of said analyzing networks will be actuated for each order of said data bits of said normal word, and a normal word actuated circuit connected to said output circuits of said analyzing networks and effective to provide a control signal as long as any one of said analyzing networks is actuated, each of said gating networks including a second gate controlling circuit controlling the conducting conditions of its said principal circuit, said normal word actuated circuit being connected to each of said second gate controlling circuits, said second controlling circuits being effective when said normal word actuated circuit is providing its said control signal thereto to render each of said first gate controlling circuits ineffective to control the conducting condition of its associated said principal circuit.

5. The relaying apparatus of claim 3 in which said separately actuated devices are memory devices, each said memory device having a clocking circuit, an input circuit and an output circuit, said input circuits of said just-mentioned memory devices being individually connected to said other terminals of said principal circuits, and clocking circuit means connecting said clocking circuits to said second clocking device, said clocking circuit means being effective to control the time of the transfers of said data bits from said input circuit to said output circuit of each said just-mentioned memory device.

6. The relaying apparatus of claim 5 in which said clocking circuit means includes gating devices individually associated with said clocking circuits of said just-mentioned memory devices, each said just-mentioned gating device having a principal circuit connecting said second clocking device to said clocking circuits of said just-mentioned memory devices, each said just-mentioned gating device having a control circuit controlling the conductive conditions of its said principal circuit, and means individually connecting said just-mentioned control circuits to said output circuits of said counting means.

7. The relaying apparatus of claim 6 including a phase synchronizing network interconnecting said second clocking device and said receiver, said phase synchronizing network being effective to maintain said pulses of said second series of pulses in a predetermined phase relationshp with the data bits output of said receiver, and phase shifting means interconnecting said second clocking device and said clocking circuit means whereby said memory devices associated with said clocking circuit means are actuated in predetermined time relationship to said data bits from said receiver.

8. The relaying apparatus of claim 1 in which said means which interconnects said first output circuit of said demodulating network to said resetting input of said counting means includes a first pulse count dividing network whereby said resetting counting means is reset solely subsequent to each first predetermined number of synchronizing pulses.

9. The relaying apparatus of claim 8 including a second count dividing network interconnecting said second clocking device and said resetting input of said resetting counting means whereby said resetting counting means is reset upon the occurrence of each second predetermined number of said periodic clocking signals of said second clocking device.

10. The relaying apparatus of claim 9 in which said second number of said periodic signals is an integer of said first predetermined number of said synchronizing pulses.

11. a communicating system for transmitting a signal representing two individual power line operating conditions of a polyphase power line from a first end portion thereof sequentially over a single communicating channel, said system comprising a transmitter, first sensing menas comprising at least a first pair of sensors associated with said power line conductors at said remote portion to individually respond to individual line operating conditions, said first sensing means being operable to provide a normal signal when all of said first pair of power line conductors are operating under normal condition and to provide fault signals when at least one of said pair of sensors is sensing a fault operating condition, a first clocking device providing a series of time-spaced control signals, a word generator connected to said clocking device and generating a series of data bits at a frequency determined by said clocking device, said word generator including word coding means, said coding means being rendered effective by said normal signal to code a normal word comprising a predetermined number of said data bits and of predetermined characteristics, a second word generator connected to said clocking device and generating said control signals at a frequency determined by said clocking device, said second word generator being connected to said first sensing means and generating fault words at a frequency as determined by said clocking device, said fault words comprising a series of data bits, the characteristics of said data bits of said fault words being determined by said signals of said sensors, the number of said data bits in each said fault word being an integer of the number of said sensors, the binary character of said data bits in each said fault word being individually determined by the individual said signals of said sensors whereby said fault words describe the operating condition of said power line.

12. The system of claim 11 in which said coding means is effective to provide at least one synchronizing binary data in each said normal word.

13. The system of claim 12 in which the number of data bits in said normal word is an integer of the number of said sensors.

14. The system of claim 11 in which said first sensing means comprises a pair of fault detectors individually associated with said pair of conductors and a pair of current sensors individually associated with said pair of conductors, any one of said fault detectors being operable to provide said first fault signal, said current sensors being operable to provide said operating conditions of said conductors.

15. The system of claim 14 including a transmitter having an input circuit and a signal transmitting output circuit, a transmitter controlling network operatively interconnecting said word generators and said input circuit of said transmitter is operable to transmit said words, said transmitter controlling network connecting at least one of said word generators to said transmitter through a flip-flop means, said flip-flop means having an output circuit connected to said input circuit of said transmitter, said flip-flop having a pair of control terminals connected to receive the words generated by said one word generator, the connection of one of said pair of control terminals including a NOT network whereby the binary characteristic of said data will control the flip and flop of said flip-flop means.

16. The system of claim 15 in which said flip-flop is a JK flip-flop having a J and a K terminal and a clocking terminal, said J and K terminals being said control terminals, and means connecting said clocking terminal to said first clocking device to control the instant of flip and flop of said flip-flop.

17. A communicating system for receiving at a one end portion of a protected power line section a plurality of transmitted sequentially timed data bits representing the operating condition of at least two individual power line conditions at the other end of the protected power line section, said system comprising, a receiver at said one end portion operable to demodulate words comprising a series of incoming data bits having a predetermined time sequence and characteristics, a clocking device providing a series of time-spaced control signals, the time spacing of said control signals of said clocking device having the substantially same time intervals as the data bits received by said receiver, a first data bit decoding means having a first input circuit connected to said clocking device to receive said time spaced control signals and to said receiver to receive said series of incoming data bits, said first decoding means including a storage device having an input circuit and a plurality of output circuits, said storage device being effective to receive said sequentially arranged data bits and to energize its said output circuits in parallel to provide a word output, said words containing a predetermined number of data bits, the character of each said data bits being determined by the character of the incoming data bits received by said receiver, said decoding means being effective when the sequence of said incoming data bits have a first predetermining sequence of characteristics to periodically provide a synchronizing output signal, a second decoding means for decoding said incoming data bits comprising a resetting gate controlling means connected to and actuated by said clocking device, said gate controlling means having a plurality of sequentially energized outut circuits energized sequentially by said time spaced control signals of said clocking device, a synchronizing circuit means connecting said first and said second decoding means and effective to cause said synchronizing output signal from said first decoding means to reset said gate controlling means, said second decoding means further comprising a plurality of gates, each of said gates having an input circuit connected to and energized by said receiver, said gates having controlling circuits individually connected to individual ones of said output circuits of said gate controlling means, each said gate having a principal circuit controlled by the respective said controlling circuit, whereby said principal circuits are controlled in accordance with said time-spaced control signals, the number of said gates being not less than the number of said individual power line operating conditions which are represented by the number of data bits embodied in said incoming words to said receiver, said output circuits of said plurality of gates being actuated in accordance with the characteristic of the data bit output of said receiver which exists when the respective said gate is opened whereby the operating condition of said principal circuits of said individual gates represents the line operating condition of a different individual power line operating condition.

18. The system of claim 17 which includes a clock synchronizing network having an input energized with a signal derived from said incoming signal and having an output energized with a synchronizing signal, means connecting said output of said clock synchronizing network to said clocking device whence its said output signals are accurately synchronized with said individual data bits of said demodulated words.

19. The system of claim 18 in which said synchronizing signal synchronizes said gate controlling means such that its said decoding signals occur in time-delayed relation to the occurrence of each said corresponding data bit.

20. The system of claim 17 which includes a gate opening inhibiting circuit interconnecting said first and second decoding means, said gate inhibiting circuit being effective when said normal word is being received to prevent the opening of said gates by said gate controlling means.

21. The system of claim 17 in which said gate controlling means comprises a resetting counting means, a second counter having an input connected to and energized periodically by said first decoding means when said normal word is being received, said second counter having an output connected to said resetting counter and effective to provide a reset signal to said resetting counter after each predetermined number of periodic energizations thereof by said first decoding means.

22. The system of claim 17 in which the ratio of the number of said data bits in said normal word relative to the number of data bits in said fault words is an integer.

23. The system of claim 17 including a flip-flop for each of said gates, each said flip-flop having a pair of conrol terminals, flip-flop control circuits individually connecting said flip-flop control terminals to said output circuits of said gates, said flip-flop control circuits connecting one of said flip-flop control terminals to its associated said output circuit through a NOT network.

24. A protective relaying apparatus for a polyphase electrical power transmission line having a plural number of line conductors, said apparatus comprising a transmitter providing an output signal, means modulating said transmitter to alter its said output signal, a first sequencing means providing a continuous series of groups of timespaced control signals, line operating condition sensing means, said sensing means being associated with said line conductors and providing a fault output signal when a fault sensed thereby, a first coding means controlled by said sense means and operatively interconnecting said sequencing means and said transmitter modulating means, said coding means normally being effective in the absence of any fault output signal to time-code said time-spaced control signals to cause said transmitter to transmit its said output signal according to a predetermined time coded pattern, the occurrence of any fault output signal being effective to render said coding means ineffective to time-code said spaced control signals according to said pattern, second coding means controlled by said sequencing means and operatively interconnecting said sensing means to said transmitter modulating means whereby said transmitter is caused to alter its said output signal in response to the line operating condition of each said line conductor, said sequencing means being effective to sequentially render said sensing means effective to actuate said modulating means as determined by the individual line conductor operating conditions as sensed by each said sensing means.

25. The aparatus of claim 24 in which said time-spaced control signals are binary bit signals, said coded pattern including at least one binary bit which is different from the remainder of said data bits of said pattern said altered output signal providing a first type of bit for a non-faulted line operating condition and a second type or bit for a faulted line operating condition.

26. The apparatus of claim 25 in which all of said first type of bits are the same type of bits and all of said second type of bits are the same type of bits.

27. A protective relaying transmitter control apparatus for a polyphase power transmission line having three conductors, said apparatus comprising line operating condition sensing means individually associated with said transmission line conductors, each of said sensing means having an output energized in response to the operating condition of the said conductor with which it is associated, first control circuit means connected to said outputs of each of said sensing means and provided with a first signal as a consequence of a fault operating condition of any of said line conductors, a plurality of second control circuit means, said plurality of second circuit means being individually connected to said plurality of condition sensing means, each of said second circuit means being effective to provide a second signal representative of the operating condition of the said line conductor with which it is associated, a counting device having at least three output terminals sequentially energized with a logic output signal in accordance with a predetermined time sequence, a modulating control, a plurality of individual circuit means individually connecting each of said second circuit means to said modulating control, and circuit means individually connecting said output terminals to said individual circuit means for sequentially supplying quantities to said modulating control representative of the said second signal supplied thereto by the respective said sensing means.

28. A single channel communication system for a plurality of individually phase comparison fault detecting systems, said communication system comprising a current sensor and a fault detector for each of said phase comparison fault detecting systems, a first counting device having a plurality of output terminals sequentially pulsed with a logical 1 output signal, the number of said output terminals of said counting devices being an integral multiple of the number of said phase comparison systems, a first plurality of AND networks equal in number to the number of said output terminals of said counting device, each said AND network having a plurality of input terminals and an output terminal, means individually connecting a first input terminal of each of said AND networks to said output terminals of said counting device, said first input terminals being NOT terminals, means connecting each of said fault detectors to a second input terminal of each of said AND networks, each of said fault detectors being effective to provide a logic 1 signal when a fault is detected thereby, a coding network connected to a third input terminal of each of said AND networks and operable to individually supply a coded group of logic 1 and logic 0 signals thereto, a second plurality of AND networks equal in number to the number of said current sensors, each of said AND networks of said second plurality of networks having a plurality of input terminals and an output terminal, means connecting each of said fault detectors to a first input terminal of each of said AND networks of said second plurality, circuit means individually connecting said current sensors to second input terminals of said AND network of said second plurality, circuit means individually connecting said plurality of output terminals of third input terminals of said AND networks of said second plurality and arranged to supply logical 1 input signals thereto in sequence, and OR network means having input means energized by a logical 1 output signal of any of said AND networks.

29. The system of claim 28 including a shift register having a data input and a clocking input and a plurality of bit outputs, said bit outputs being equal in number to the number of said first plurality of AND networks, a clocking device providing clocking signals to said clocking input at substantially the same frequency that said output terminals of said first counting device are pulsed, a third plurality of AND networks, said third plurality of AND networks being equal in number to the number of said bit output terminals, each said AND network of said third plurality having a plurality of input terminals equal in number to the number of said bit outputs, circuit means connecting said bit outputs and said inputs of said third plurality of said AND networks and including at least one inverting device, said last-named circuit means being arranged such that at least one of said AND networks of said third plurality will have a logical 1 output for any sequential order of said coded group of logic 1 and logic 0 signals, a fourth plurality of AND networks, said fourth plurality of AND networks being not less in number than the number of said current sensors, each of said AND networks of said fourth plurality thereof having at least a first, a second and a third input terminal and an output terminal, circuit means connecting said first terminal of each of said AND networks of said fourth plurality thereof to said output terminals of said AND networks of said third plurality thereof, said lastnamed circuit means being arranged such that whenever any of said AND networks of said third plurality thereof are supplying a logical 1 signal, all of said AND networks of said fourth plurality thereof must energize their said output terminals with a logical 0 signal, circuit means operatively connecting each of said second input terminals of said AND networks of said fourth plurality thereof to said data input terminal of said shift register, a second counting device having a plurality of output terminals sequentially pulsed with a logical 1 output signal, said output terminal of said second counting device being an integral multiple of the number of said phase comparison systems, said output terminals of said second counting device being pulsed at substantially the same frequency as said output terminals of said first counting device, circuit means individually connecting said third input terminals of said AND networks of said fourth plurality thereof to said output terminals in the same sequence as said third input terminals of said AND networks of said second plurality thereof, and a plurality of output control circuits individually connected to output terminals of said AND networks of said fourth plurality thereof.

30. The system of claim 21 in which each of said output control circuits includes a flip-flop having a pair of control terminals and an output terminal, each of said control terminals of said flip-flop of each of said output control circuits being connected to said output terminal of the said AND network of said fourth plurality, the connection of one of said contact terminals of each of said flip-flops of each of said output control circuits including an inverting network whereby said flip-flop is flipped and flopped as a consequence of the change in the logic signal output of the said AND network to which it is connected.

31. The systems of claim 30 in which each of said flip-flops is a J-K flip-flop and said control terminals are the J and K terminals thereof, each said flip-flop having a clocking terminal, each of said output control circuits being provided with a clocking AND network, each said clocking AND network having first and second input terminals and an output terminal, said first input terminal of each of said clocking AND networks being individually connected to individual output terminals of said second counting device, circuit means connecting said second input terminal of each of said clocking AND networks to said clocking device, each of said output control circuits including circuit means connecting said clocking terminal of its said flip-flop to said output terminal of its said clocking AND network.

32. The method of transmitting the operating information of a plurality of individual phase conductors of a polyphase power line between a remote and a local relaying location over a single communicating channel, said method comprising the steps of providing a first endless series of bits generated in accordance with a first established time pattern, of establishing a transmittable trip inhibiting signal during periods of normal operations of the conductors at one of said relaying locations, said inhibiting signal comprising a first repeating series of first groups of binarily coded bits, each said group of pulses comprising a predetermined number of said bits, of serially transmitting said coded bits to the other of said relaying locations, of determining at said other location upon the acceptance of each received bit that the just received bit is a bit in accordance with the bits of this transmittable trip inhibiting signal, of providing a received trip inhibiting signal at said other location as long as said received bits are determined to be bits of said transmittable trip inhibiting signal, of establishing a synchronizing bit at said other relaying location in response to the reception of a selected bit of said transmittable inhibiting signal, of providing a second endless series of bits generated in substantial accordance with the bits of said first endless series, of selecting certain of said synchronizing bits to periodically synchronize the bits of said second series with the bits of said first series, of interrupting the transmission of the bits of said transmittable trip inhibiting signal upon the occurrence of a fault operating condition of said power line at said one location, of thereafter providing a third repeating series of third groups of binarily coded bits at said one location, said sequented bits of said third group of bits representing binarily and in sequence the individual operating condition of said phase conductors at said one location transmitting in sequence the bits of said third groups, of terminating said received trip inhibiting signal at said other locations in response to he reception of bits of said third group and of comparing the bits of said third groups in timed relation to the bits of said second group to determine at said other location the operating condition or each of the individual conductors as sensed at said one location.

* * * * *